United States Patent [19]

Lehto et al.

[11] Patent Number: 5,185,022
[45] Date of Patent: * Feb. 9, 1993

[54] MOULD ASSEMBLY FOR BENDING DIFFICULT BENDING SHAPES IN A GLASS SHEET

[75] Inventors: Esko O. Lehto, Kangasala; Jukka H. Vehmas, Tampere, both of Finland

[73] Assignee: Tamglass Engineering OY, Tampere, Finland

[ * ] Notice: The portion of the term of this patent subsequent to Jan. 7, 2009 has been disclaimed.

[21] Appl. No.: 789,334

[22] Filed: Nov. 8, 1991

Related U.S. Application Data

[62] Division of Ser. No. 572,012, Aug. 24, 1990, Pat. No. 5,078,770.

[30] Foreign Application Priority Data

Mar. 30, 1990 [FI] Finland .................................. 901603

[51] Int. Cl.⁵ .......................................... C03B 23/023
[52] U.S. Cl. ................................. 65/182.200; 65/273; 65/287
[58] Field of Search ............... 65/25.4, 106, 107, 182.2, 65/273, 287, 288, 350

[56] References Cited

U.S. PATENT DOCUMENTS

| | | | |
|---|---|---|---|
| 3,223,443 | 12/1965 | Misson | 65/182.2 |
| 3,468,645 | 9/1969 | McMaster et al. | 65/107 |
| 3,526,489 | 9/1970 | McPhail | 65/287 |
| 3,756,797 | 9/1973 | Akeyoshi et al. | 65/107 |
| 4,508,556 | 4/1985 | Bennett et al. | 65/25.4 |
| 4,767,437 | 8/1988 | Lampman et al. | 65/287 |
| 4,828,598 | 5/1989 | Imamura et al. | 65/106 |
| 4,979,977 | 12/1990 | Frank et al. | 65/107 |

Primary Examiner—Joye L. Woodward
Attorney, Agent, or Firm—Burns, Doane, Swecker & Mathis

[57] ABSTRACT

The invention relates to a method for bending difficult bending shapes such as an S-shape in a glass sheet. The downward bending of an outline-mould supported, heated glass sheet is assisted by a non-engaging lower partial surface mould used for blowing to a bending line (BL) or its vicinity a gas having a temperature at least equal to that of glass, the gas serving simultaneously as a glass carrier preventing its falling or excessive downward sagging. Blasting orifices in the shaping surface are adapted to concentrate heating on the most problematic areas of a bending line.

11 Claims, 4 Drawing Sheets

MOULD ASSEMBLY FOR BENDING DIFFICULT BENDING SHAPES IN A GLASS SHEET

This application is a divisional of application Ser. No. 07/572,012, filed Aug. 24, 1990 now U.S. Pat. No. 5,078,770.

BACKGROUND AND SUMMARY

The present invention relates to a method for bending difficult bending shapes such as an S-shape in a glass sheet, in which method:

- a glass sheet is heated to a bending temperature
- the heated glass sheet is supported on an outline mould having a shaping surface which is complementary to a final bending shape, and
- the glass sheet is bent to its final configuration by pressing it from above and/or by supporting it from below by a non-engaging mould.

The invention relates also to a bending mould assembly, comprising:

- an outline mould having a shaping surface which is complementary to a final bending shape,
- a non-engaging bending mould having a shaping surface which is complementary to a final bending shape.

U.S. Pat. No. 4,260,409 discloses a method and an assembly for bending difficult bending shapes such as an S-shape in a glass sheet. A heated glass sheet carried on an outline mould is bent between upper and lower press shaping surfaces. The shaping surfaces are glass-engaging. Within the areas of difficult bending shapes a glass is locally elongated with a glass sheet being displaced between the shaping surfaces. This results in the abrasion of the glass surface. In any case, the engaging whole surface moulds leave marks on glass surface since a difficult shape cannot be obtained unless the glass is relatively soft (easily deformable).

An object of the invention is to provide an improved method and mould assembly for bending difficult shapes in a glass sheet in a manner that the bending can be effected in a controllable fashion also within the areas in which a glass sheet is subjected to intense elongation without creating adverse optical errors within these areas or in the immediate vicinity thereof.

This object is achieved by means of the invention on the basis of the characterizing features set forth in the annexed claims.

BRIEF DESCRIPTION OF THE DRAWINGS

The invention will now be described in more detail with reference made to the accompanying drawings, in which.

DESCRIPTION

Figure 1:
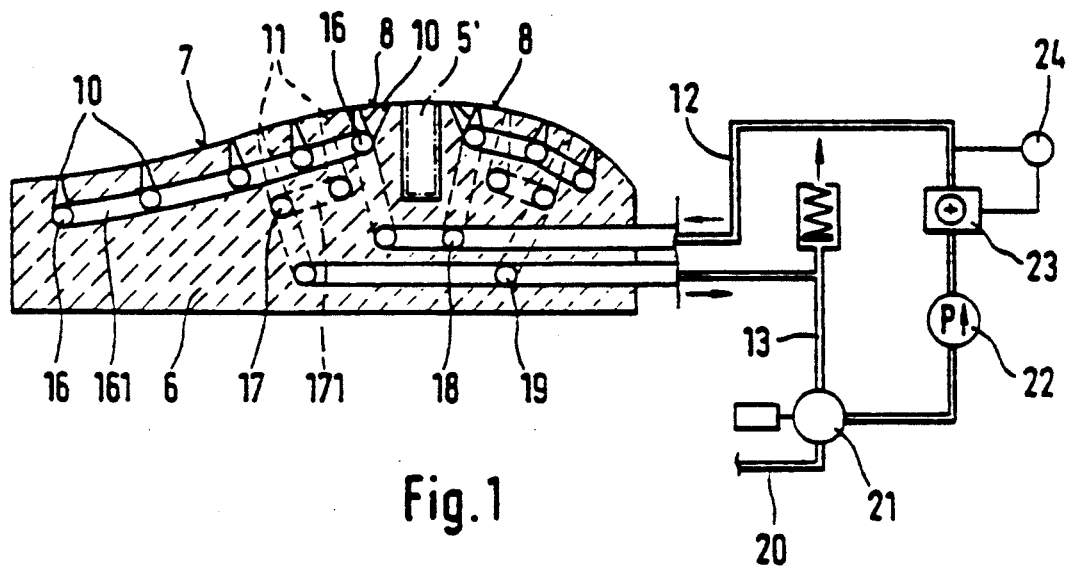
FIG. 1a is a schematic view of an assembly used for carrying out a method of the invention and FIG. 1 is a sectional view of a lower partial surface mould 6.
Figure 1A:
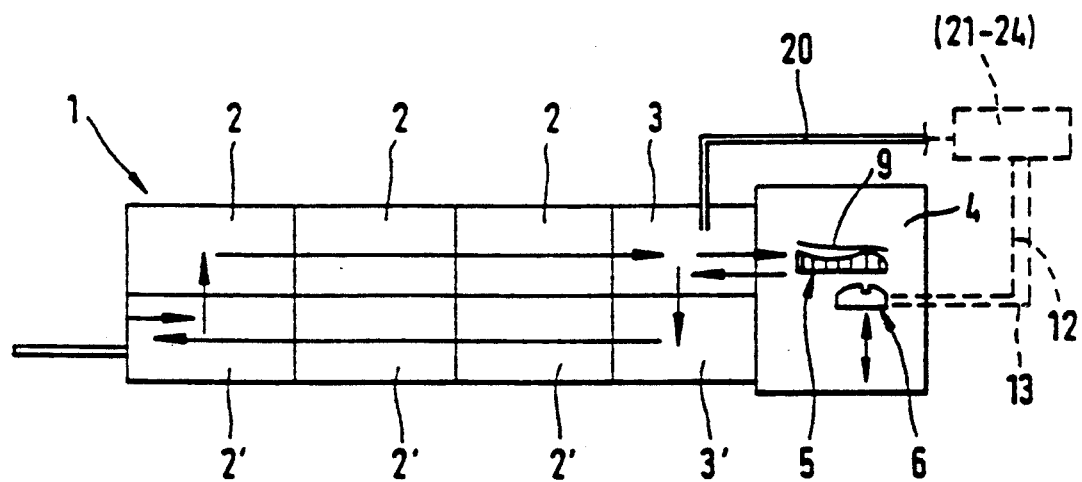

The embodiment of FIG. 1 is shown to include a lower partial surface mould 6 which is positioned in a bending section 4 for difficult bending shapes. A glass sheet 9 supported on an outline mould 5 is carried and heated gradually in successive heating sections 2. From the final heating section 3 said outline mould 5 along with its glass sheet 9 is carried into a bending section 4, wherein the bending of a difficult shape is effected by means of a mould assembly of the invention, as described in more detail hereinafter. The bent glass sheet is gradually cooled in cooling sections 3', 2' If necessary, the bent glass sheet can also be carried on outline mould 5 into a tempering section, so a method of the invention can also be applied in connection of the bending of automotive backlights. However, the method is particularly suitable for bending windshields. A windshield bending furnace generally indicated by reference numeral 1 is described in more detail in U.S. Pat. No. 4,497,645.

In the present case, the lower partial surface mould 6 is provided with a convex shaping surface portion 8 on either side of a supporting rib 5' included in outline mould 5. Said mould 6 further includes a shaping surface portion 7 which is substantially flat or slightly convex or concave.

The shaping surface 7, 8 is provided with orifices 10 which are connected by way of an in-mould distribution manifold 16, 161, 18 to a pressure-gas pipe 12. The shaping surface, at least in the immediate vicinity of a bending line, can also be provided with suction orifices 11 which are connected by way of a collection manifold 17, 171, 19 to a suction channel 13. The suction side of a fan 22 is connected to a three-way valve 21 for controlling the relative relationship between the amounts of air coming from suction pipe 13 and a pipe 20 connected with the interior of the hottest furnace section 3. Thus, valve 20 can be used for controlling the effect of a suction prevailing on the shaping surface in relation to the effect of blowing. An adjustment of the rotating speed of fan 22 or a valve fitted in pipe 12 can be used for controlling the effect of blowing coming in through the orifices. Temperature of the blasting or blowing gas can be regulated by means of a heater 23 which is controlled by a thermostat 24.

When bending a glass sheet a greater thermal effect is required on the areas in which the deformation (flexure and/or elongation) of a glass sheet is the greatest. This object is achieved by means of a lower partial surface mould 6 used for blowing a gas having a temperature at least equal to that of the glass to a glass sheet bending line or to the vicinity thereof through orifices 10. At the same time the gas serves as a glass carrier preventing its falling or excessive downward sagging. The area in which the supporting rib 5' of outline mould 5 and the bending line of a glass sheet coincide possibly includes a hard-to-control zone, said zone being provided with extra heat. Whenever required, this particular zone must heated more than others, so over this zone, said mould 6 can have a densified orifice pitch, larger blast orifices 10, higher blasting pressure or the air blown to the zone is hotter than that blown to the rest of the area.

In the latter case, it is possible to employ either a separate blasting manifold section or heating resistances disposed in some of the distribution channels 16. It is also possible to provide a system of suction orifices 11 only in critical zones for a slightly improved transfer of heat.

The distribution channels 16 inside mould 6 are connected by means of transverse connecting channels 161 for producing a ladder-like or lattice-like distribution manifold. The same applies also to collection channels 17 and their connecting channels 171. The manufacturing technique of such a mould and its internal manifold is described in the Applicants' co-pending patent application No. 571,971 now U.S. Pat. No. 5,079,931.

Figure 2:
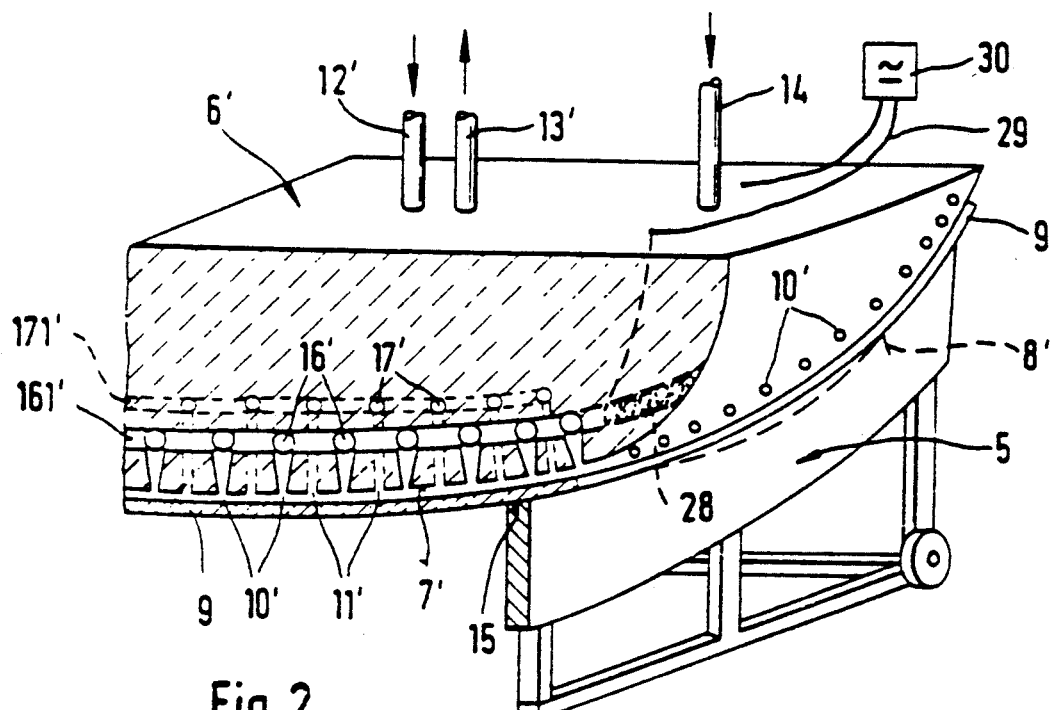
FIG. 2 is a perspective view in vertical section of a portion of the upper mould in a mould assembly according to one embodiment of the invention.

FIG. 2 illustrates an upper non-engaging partial or whole surface mould which can be used in the bending of difficult shapes together with lower mould 6, The orifice systems and chaneling of a shaping surface 7', 8' included in an upper mould 6' are designed in principle the same way as described in connection with mould 6. Thus, the corresponding components are indicated with the same reference numerals provided, however, with an inverted comma.

Since the shaping surface of upper mould 6' may be considerably larger than that of lower mould 6, said upper mould 6' must also be provided with suction orifices 11' for a controlled discharge of the blasting air. The lower moulds 6 having a rather large shaping surface must also be provided with an array of suction orifices 11. The pressure-gas pipe 12' and suction pipe 13' can be linked with a similar type of gas circulation system as the one shown in FIG. 1. If necessary, it is possible to provide a separate channeling and a separate hot-gas pipe 14 for blowing hotter gas to hard-to-control surface areas. The same way as in the lower mould, the upper mould can also have, over a certain effective mould area, a densified orifice pitch, larger orifices or increased blasting pressure. Thus, transfer of heat can be applied to a certain effective or active area without separate channeling. Also a heating resistance 28 fitted in distribution channel 16' can used for a concentrated thermal effect. Resistance 28 is connected with wires 29 to a power source 30.

Figure 6:
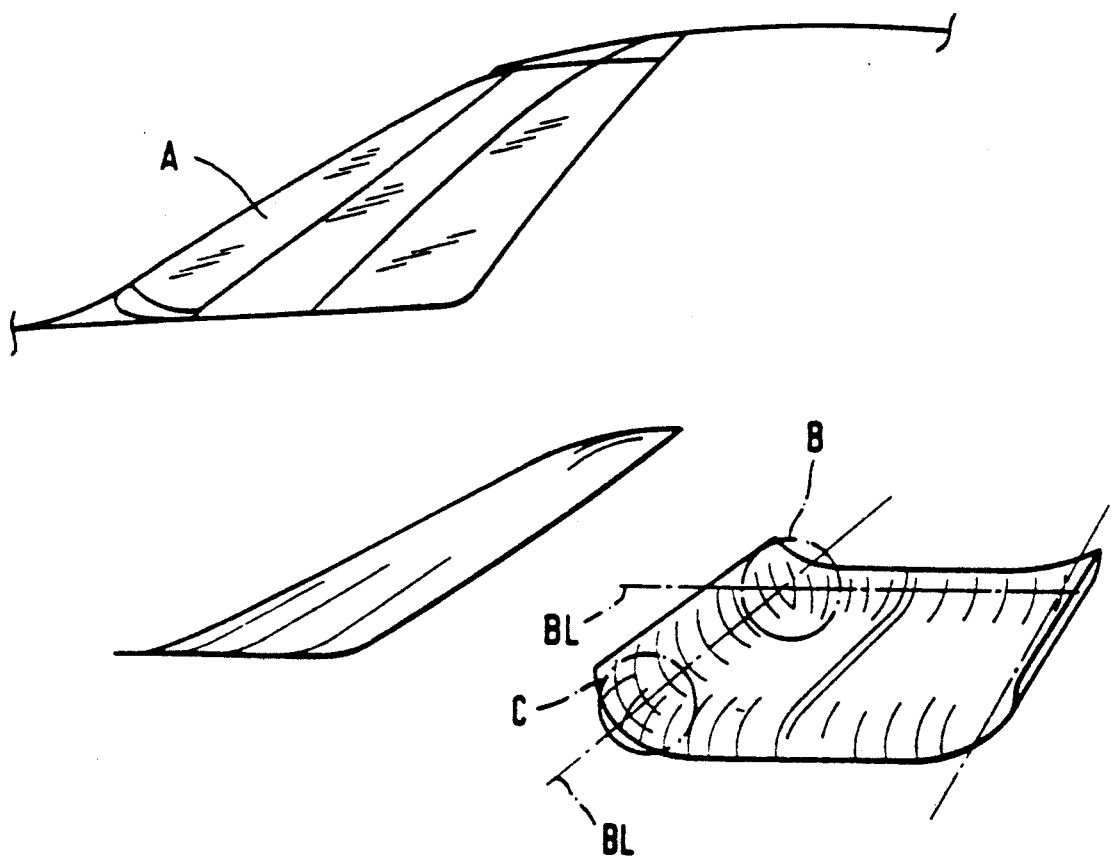
FIG. 6 shows examples of difficult bending shapes that can be obtained by means of a method and an assembly of the invention.

FIG. 6 illustrates an S-shaped automotive windshield that can be bent by using a method and mould assembly of the invention. Reference character A indicates a section which corresponds to a present, conventional windshield configuration. When the windshield is extended beyond this section or area, the lower glass edge curves horizontally forward and the upper edge horizontally backward, thus providing an S-shape. In addition, the lateral glass edges curve backward. This produces criss-crossing bending lines BL whose crossing points are formed as a spherical surface B or some other multi-curving surface portion C. Over the areas B and C, the glass is subjected to dramatic elongation in addition to bending.

Figure 3:
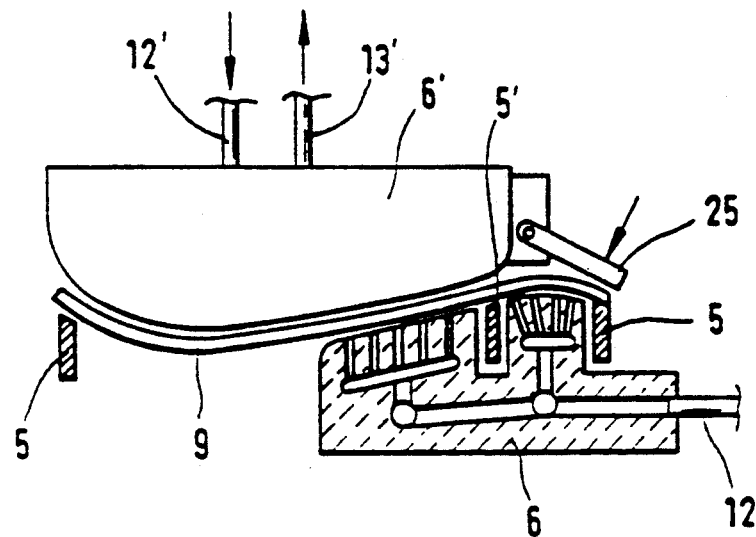
FIG. 3 shows schematically the bending of an S-shape by means of a partial surface upper press mould and a partial surface lower press mould.

FIG. 3 illustrates application of the invention in a case which involves the use of a partial surface upper mould 6' and a partial surface lower mould 6 for bending a glass sheet 9 supported on an outline mould 5. The upper partial surface mould is further provided with a mechanical press member 25 for assisting the downward bending of the marginal edge portion of glass. The upper mould 6' can be provided with an array of blasting and suction orifices (see FIG. 2). A pressure pipe 12' and a suction pipe 13' can be linked with a gas circulation system similar to the one shown in FIG. 1. The lower partial surface mould 6 can only be provided with an array of blasting orifices which is connected to pressure pipe 12, wherein a hot gas is supplied from furnace section 3 as shown in FIG. 1.

Figure 4:
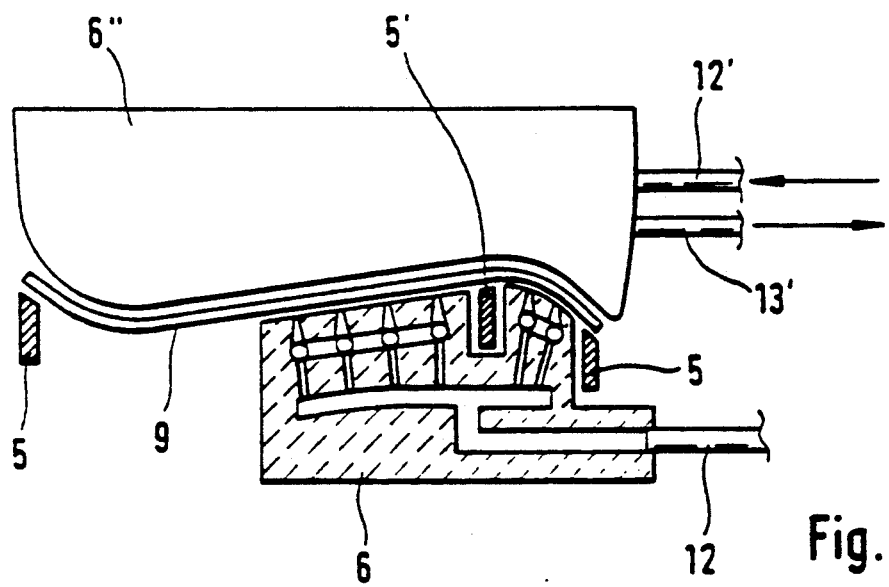
FIG. 4 shows the bending of an S-shape by means of a whole surface upper press mould and a partial surface lower supporting mould.

The difference of the embodiment of FIG. 4 from FIG. 3 is the use of a whole surface upper mould 6'.

Figure 5:
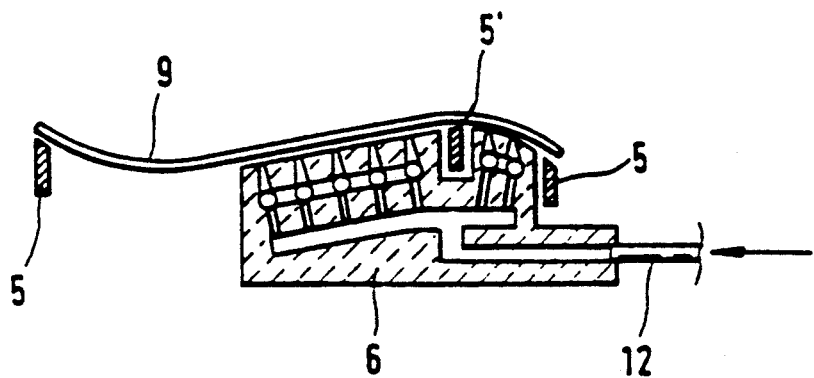
FIG. 5 is a schematical view of an arrangement, wherein the gravitational bending of an S-shape is assisted by means of a non-engaging lower partial surface mould.

The embodiment of FIG. 5 differs from the preceding ones in that there is only used a lower partial surface mould 6 which can be provided with blasting orifices only or with blasting and suction orifices, as shown in FIG. 1. Also in this case, the essential feature is to produce a concentrated heating effect and a concentrated shaping support (bearing effect) on the predetermined areas below a glass sheet by means of a glass sheet non-engaging partial surface mould. The heating effect must be concentrated locally on a bending line and its surrounding. The blasting gas must have a temperature at least equal to that of glass. As the bending progresses, said lower partial surface mould 6 is brought closer to a bending line and it may be necessary to increase or heat up the blasting.

When the bending is finished, said lower partial surface mould 6 can also be used for cooling a bending line by blowing colder air from blasting orifices 10 to a bending line or its surroundings.

It is also possible to mount the lower partial surface mould 6 fixedly relative to outline mould 5, whereby the partial surface mould cannot be displaced but it can serve at the initial stage of heating e.g. as a support for glass. Hot gas is being used when bending the glass as described above. Also the mould has a structure as described above.

The gas applied is primarily air with various gases or vapours possibly added in. For example, $SO_2$ can be used for building a protective coating film, whereby a possible contact between mould and surface does not as easily leave a mark on the glass surface.

The term partial surface means in this context that the surface area of a mould is typically 10–30% of the surface area of a glass sheet. Even in the case where two separate partial surface moulds are used, the combined surface area thereof is typically clearly less than 30% of the surface area of a glass sheet. The lower partial surface mould support refers a support, wherein the combined lower shaping surface does not exceed 50% of the surface area confined by the outer periphery of the shaping surface 15 of outline mould 5.

We claim:

1. A bending mould assembly for bending a glass sheet into a shape having at least one bending line comprising:

an outline mould frame for supporting said glass sheet, said outline mould frame having a contour which is complementary to a final bending shape of said glass sheet;

a non-engaging lower partial surface mould positioned below said glass sheet, said lower partial surface mould having a shaping surface complementary to said final bending shape of said glass sheet, said lower partial surface mould having a surface area no more than 50% of the total surface area of said glass sheet;

said lower partial surface mould including blasting means for heating and supporting at least a portion of said glass sheet with hot gas, said blasting means including a plurality of blasting orifices connected to each other through an intra-mould distribution manifold.

2. A bending mould assembly according to claim 1, wherein said lower partial surface mould includes a plurality of suction orifices for controlling transfer of heat to said glass sheet, said suction orifices being connected to each other by an intra-mould distribution manifold.

3. A bending mould assembly according to claim 2, wherein said assembly includes a hot gas blower having a pressure side and a suction side, said pressure side being connected to said blasting orifices through a pressure gas pipe, said suction side being connected to said intra-mould distribution manifold of said suction orifices through a three-way valve and a de-gassing pipe, said three-way valve being connected to a heating furnace through an air pipe, said three-way valve being adjustable so as to control the relative amount of air that is introduced into said suction side of said hot-gas blower from each of said suction pipe and said air pipe.

4. A being mould assembly according to claim 2, wherein said intra-mould distribution manifold for said suction orifices is formed of a lattice-like channel system.

5. A being mould assembly according to claim 1, wherein said intra-mould distribution manifold for said blasting orifices is formed of a lattice-like channel system.

6. A bending mould assembly in accordance with claim 1, where said lower partial surface mould has a surface area within a range of 10-30% of the total surface area of a glass sheet.

7. A bending mould assembly in accordance with claim 1, wherein said lower partial surface mould has a surface area no more than 50% of a portion of said total surface area of said glass sheet wherein said portion is defined by an outer periphery of said outline mould frame.

8. A bending mould assembly for bending a glass sheet into a shape having at least one bending line comprising:
    an outline mould frame for supporting said glass sheet, said outline mould frame having a contour which is complementary to a final bending shape of said glass sheet;
    a non-engaging lower partial surface mould positioned below said glass sheet, said lower partial surface mould having a shaping surface complementary to said final bending shape of said glass sheet, said lower partial surface mould having a surface area no more than 50% of the total surface area of said glass sheet;
    said lower partial surface mould including blasting means for supporting at least a portion of said glass sheet such that excessive sagging is prevented during heating and bending of said glass sheet.

9. A bending mould assembly according to claim 8, wherein said assembly includes a non-engaging upper surface mould means for applying a bending force to said glass sheet, said upper surface mould means having a shaping surface that includes a plurality of blasting orifices for delivering hot gas to said glass sheet, said blasting orifices being connected to each other by an intra-mould distribution manifold.

10. A bending mould assembly in accordance with claim 8, wherein said lower partial surface mould has a surface area within a range of 10-30% of the total surface area of a glass sheet.

11. A bending mould assembly in accordance with claim 8, wherein said lower partial surface mould has a surface are no more than 50% of a portion of said total surface area of said glass sheet, wherein said portion is defined by an outer periphery of said outline mould frame.

* * * * *